United States Patent [19]

Ericson et al.

[11] 3,851,475

[45] Dec. 3, 1974

[54] COMBINED TURBINE AND RECIPROCATING PISTON ENGINE

[76] Inventors: Douglas E. Ericson, 1192 Mojave; Clyde A. Hawley, Rt. 4, Box 214, both of Idaho Falls, Idaho 83401

[22] Filed: Oct. 10, 1973

[21] Appl. No.: 405,006

[52] U.S. Cl. .................... 60/715, 60/716, 60/720
[51] Int. Cl. ........................................ F01b 21/04
[58] Field of Search ............ 60/698, 715, 716, 720

[56] References Cited
UNITED STATES PATENTS
| | | | |
|---|---|---|---|
| 705,644 | 7/1902 | Cary | 60/715 |
| 1,048,311 | 12/1912 | High | 60/715 |

*Primary Examiner*—Irwin C. Cohen
*Assistant Examiner*—Allen M. Ostrager
*Attorney, Agent, or Firm*—Clarence A. O'Brien; Harvey B. Jacobson

[57] ABSTRACT

An elongated stator housing is provided and includes a center longitudinal drive shaft journaled therein provided with axial flow turbine structures at the opposite ends of the housing and a central axial drum having circumferentially spaced piston bores formed therethrough paralleling the drive shaft spaced between the turbine structures. Double-ended pistons are reciprocal in the piston bores and equipped with central lateral stems slidable through longitudinal slots formed in and spaced about the outer periphery of the drum communicating with the piston bores and the outer ends of the stems have bearings thereon captive in an inwardly opening sine wave groove or track formed in and about the inner periphery of the central portion of the stator housing. Stationary plenums cover opposite diametric halves of the opposite ends of the central drum and each plenum opens outwardly from the stator housing for exhausting expanded gas from the engine. Gas under pressure is ducted into the opposite ends of the stator housing for driving the turbine structures and the gas is subsequently exposed to the corresponding piston heads in opposite diametric halves of the opposite ends of the central drum for driving the pistons toward the remote ends of the stator housing and thereby driving the drum through the engagement of the piston stem bearings in the sine wave groove formed about the inner periphery of the central portion of the stator housing, the pistons being thereafter moved back toward the corresponding ends of the housings while the associated piston bore ends are registered with the corresponding exhaust plenums.

10 Claims, 7 Drawing Figures

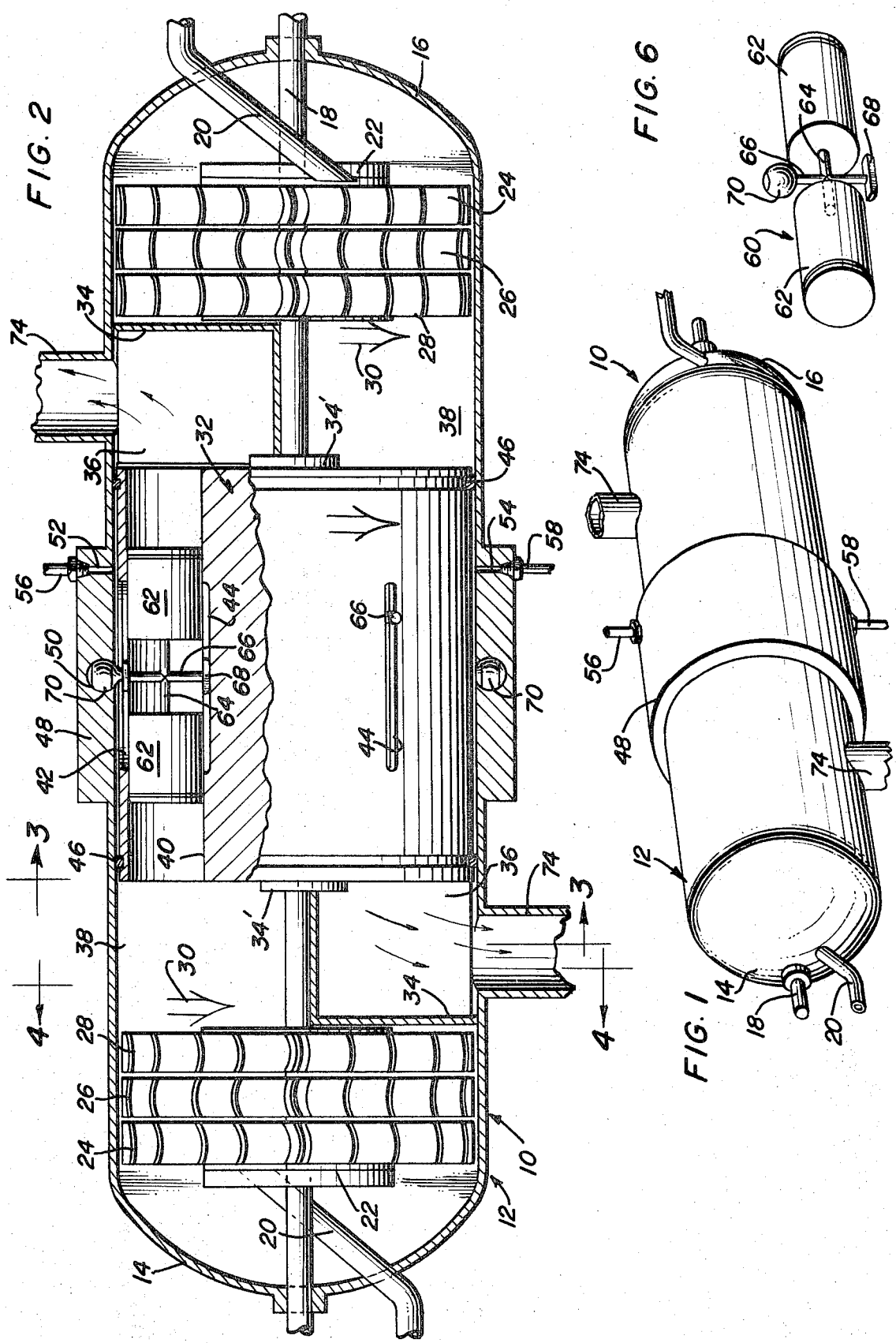

COMBINED TURBINE AND RECIPROCATING PISTON ENGINE

The engine of the instant invention has been designed primarily for use as a steam engine. However, the engine may also be utilized in conjunction with other expandable gases such as those which may be generated from external combustion.

The engine is designed to utilize expandable gases from any source in an efficient manner to develop usable rotary power. The engine is designed for high horsepower output per unit of weight and volume and furthermore constitutes a unique blend of rotary turbine construction of the axial flow type as well as reciprocating piston engine construction. Furthermore, the expandable gases utilized to power the engine are twice expanded whereby the utmost power output is generated from the potential represented by the expandable gases delivered to the engine.

The main object of this invention is to provide a rotary engine of unique design and which may, because of its design, utilize many different expandable gases as the power input.

Another object of this invention is to provide an engine which will be compact and of lightweight construction.

A further object of this invention is to provide an engine which will have a high horsepower-to-weight unit output and which will also enjoy high torque output throughout a broad range of operating speed.

A final object of this invention to be specifically enumerated herein is to provide an engine in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part thereof, wherein like numerals refer to throughout.

FIG. 1 is a perspective view of the engine of the instant invention; environment FIG. 2 is an enlarged longitudinal sectional view taken substantiually upon a plane passing through the longitudinal centerline of the engine;

FIG. 6 is a perspective view of one of the double piston assemblies; and

Figure 4:
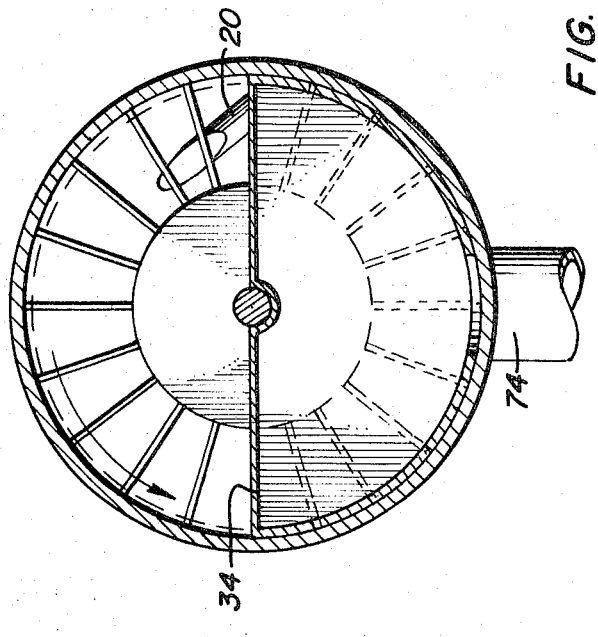
FIG. 4 is a transverse sectional view taken substantially upon the plane indicated by the section line 4—4 of FIG. 2.
Figure 7:
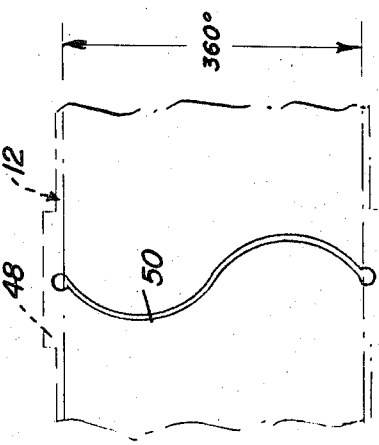
FIG. 7 is a schematic view illustrating the 360° sine wave groove in the central stator portion of the engine housing.

Referring now more specifically to the drawings, the numeral 10 generally designates the engine of the instant invention. The engine 10 includes an elongated housing referred to in general by the reference numeral 12 having rounded opposite end walls 14 and 16. The opposite ends of a center drive shaft 18 are journaled through the end walls 14 and 16 and each end wall 14 and 16 includes an expandable gas inlet pipe 20 opening therethrough.

Mounted on each end of the shaft 18 is a drum 22 having three axially spaced sets of circumferentially spaced turbine blades 24, 26 and 28 mounted thereon. The turbine blades 24 and 28 are cupped in one direction and the turbine blades 26 are cupped in the opposite direction. The outlet end of the inlet pipes 20 is beveled and disposed to jet high pressure gases onto and through the turbine blades 24, 26 and 28 to impart rotation to the shaft 18 in the direction of the arrows 30.

A center drum referred to in general by the reference numeral 32 is mounted on the shaft 18 and spaced between the drums 22. Also, half cylindrical stationary plenums 34 are mounted from the housing 12 within the spaces between the opposite ends of the drum 30 and 22. The plenums 34 define exhaust chambers 36 and the remainder of the spaces between the opposite ends of the drum 32 and the drums 22 define transfer chamber 38.

The drum 32 is provided with six circumferentially spaced piston bores 40 formed therethrough and which parallel and are spaced about the shaft 18 upon which the drum 32 is mounted. The drum 32 includes six longitudinal slots 42 formed in its outer periphery which open into and extend along the corresponding bores 40 and the drum 32 additionally includes longitudinal grooves 44 in each of the bores 40 on the sides thereof adjacent the shaft 38.

The opposite ends of the drum 32 are provided with circumferentially extending seals 46 which form a fluid-tight seal with the inner surfaces of the central portion of the housing 12 and the central portion of the housing 12 includes a radially thickened portion 48 having an inwardly opening 360° sine wave groove 50 formed therein. In addition, diametrically opposite portions of the radially thickened portion 48 of the housing 12 include lubricating oil inlet and outlet passage 52 and 54 to which supply and discharge lines 56 and 58 are connected.

Double-ended piston assemblies referred to in general by the reference numerals 60 are disposed in the bores 40 and each piston assembly includes a pair of opposite end piston heads 62 interconnected by means of an axial shank 64 extending therebetween. Also, each axial shank 64 includes a transverse shank 66 equipped with a slide follower 68 on one end slidably received in the corresponding groove 44 and a rotable bearing member 70 on its other end captive within the groove 50, the end of the shank 66 of each piston assembly 60 from which the corresponding bearing 70 is journaled being slidably received through the corresponding slot 44.

Figure 3:
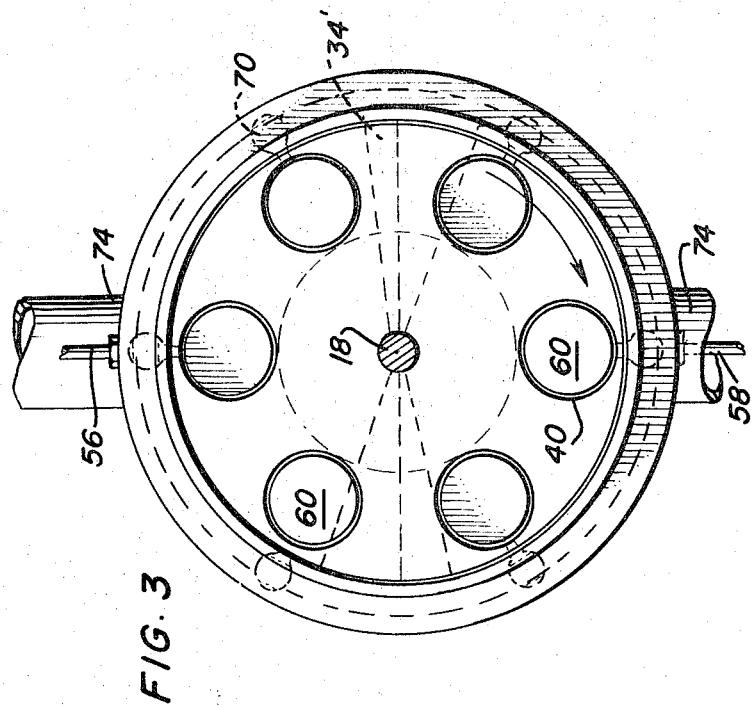
FIG. 3 is a transverse sectional view taken substantially upon the plane indicated by the section line 3—3 of FIG. 2.
Figure 5:
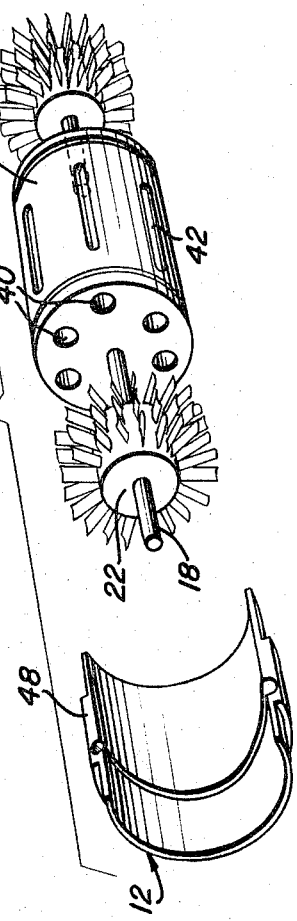
FIG. 5 is an exploded perspective view of the rotatable components of the engine and with a half section of the central stator portion of the housing illustrated in exploded position.

It will also be noted from FIGS. 2 and 3 of the drawings that each of the plenums 34 includes a blanking or cover plate 34' relative to which the shaft 18 is rotatable. The cicumferential extent of each of the blanking plates 34' on diametrically opposite radii of the shaft 18 is slightly greater than the diameter of the bores 40 and in the manner it is impossible for one of the bores 40 to be registered with the corresponding exhaust chamber 38 at the same time it is registered with the corresponding transfer chamber 38.

In operation, any expandable gas such as high pressure steam or combustion gases may be supplied to the engine 10 through the inlet pipes 20. This expandable gas reacts upon the turbine blades 24, 26 and 28 at the opposite ends of the housing 12 in order to impart rotation to the shaft 18 in the direction of the arrows 30. Thereafter, the expanding gas is disposed in the respective transfer chambers 38 and in communication with the corresponding ends of the bores 40 which open into the transfer chamber 38. Thus, the piston assemblies 60 registered with the transfer chambers 38 are urged by the still expanding gases toward the remote ends of the housing 12 and the linear movement of the pistons 60 is transferred into rotary motion of the drum 32 by the bearings 70 on the ends of the shanks 66 captive within the groove 50. Of course, the ends of the bores 40 registered with the exhaust chambers 36 have the previously expanded gases exhausted therefrom into the exhaust chambers 36 and out the discharge pipes 74 which open outwardly of the housing 12 from the plenums 34. As hereinbefore set forth, as a piston assembly 60 moves to the limit of the exhaust stroke at one end of the housing the piston bore 40 in which it is disposed moves into registry with the corresponding plate 34'. Thereafter, that same piston bore end uncovers from the corresponding plate 34' and moves into communication with the corresponding transfer chamber 38 in which once expanded gases are disposed for further expansion in driving the associated piston assembly 60 back toward the opposite end of the housing 12.

Because the reciprocating piston portion of the engine 10 is capable of developing reasonable quantities of torque at low rpm and the turbine portions of the engine 10 are capable of developing high torque at high rpm, the useful operating speed range of the engine 10 is greatly extended. Further, as hereinbeore set forth, various expandable gases may be utilized to power the engine 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, an elongated housing, a power shaft journaled longitudinally in said housing, turbine wheel means mounted on the opposite end portions of said shaft within said housing, a cylinder drum mounted on said shaft between and spaced from said turbine wheel means, a plurality of piston bore formed through said drum spaced outwardly from and about said shaft and paralleling the latter, a double-ended piston assembly reciprocal in ecah of said bores and drivingly connected to said housing for rotating said drum in response to reciprocation relative to the latter, the spacing between the opposite ends of said drum and said turbine wheel means including stationary opposite end exhaust gas plenum means opening outwardly to the exterior of said housing and with which the remote ends of the bores disposed on opposite sides of a diametric plane of said drum are registered, at least a portion of said spacing not occupied by said plenum means defining gas transfer chamber means for the transfer of gases being discharged from said turbine wheel means to those piston bores not registered with said exhaust gas plenum means.

2. The combination of claim 1 wherein said drum includes six piston bores evenly spaced about said shaft.

3. The combination of claim 1 wherein said exhaust gas plenum means open laterally outwardly of said housing intermediate its opposite ends.

4. The combination of claim 1 including opposite end seal means operatively associated with the opposite end portions of opposing inner surfaces of said housing.

5. The combination of claim 4 including lubricating oil inlet and outlet means opening into the interior of said housing intermediate said opposite end seal means..

6. The combination of claim 1 wherein said opposite end exhaust plenum means each open toward and closely overlie substantially one diametric half of the corresponding drum end.

7. The combination of claim 6 including plate means stationary relative to said housing registered with diametrically opposite small angle sectors of each end of said drum operative to block off and prevent the corresponding piston bore ends from registering with the associated exhaust gas plenum and transfer passage at the same time.

8. The combination of claim 7 including opposite end seal means operatively associated with the opposite end portions of said drum and the opposing inner surfaces of said housing.

9. The combination of claim 8 including lubricating oil inlet and outlet means opening into the interior of said housing intermediate said opposite end seal means.

10. In combination, an elongated housing, a power shaft journaled longitudinally in said housing, turbine wheel means mounted on the opposite end portions of said shaft within said housing, a cylinder drum mounted on said shaft between and spaced from said turbine wheel means, a plurality of piston bores formed through said drum spaced outwardly from and about said shaft and paralleling the latter, a double-ended piston assembly reciprocal in each of said bores and drivingly connected to said housing for rotating said drum in response to reciprocation relative to the latter, said housing including stationary exhaust means registered with the first set of remote ends of the bores disposed on opposite sides of a diametric plane of said drum and gas transfer means for transferring gases discharged from the adjacent ends of said turbine wheel means to the other set of remote ends of the bores disposed on opposite sides of said diametric plane.

* * * * *